US010579666B2

(12) United States Patent
Bostick et al.

(10) Patent No.: US 10,579,666 B2
(45) Date of Patent: Mar. 3, 2020

(54) COMPUTERIZED COGNITIVE RECALL ASSISTANCE

(71) Applicant: International Business Machines Corporation, Armonk, NY (US)

(72) Inventors: James E. Bostick, Austin, TX (US); John M. Ganci, Jr., Durham, NC (US); Martin G. Keen, Research Triangle Park, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 535 days.

(21) Appl. No.: 15/439,252

(22) Filed: Feb. 22, 2017

(65) Prior Publication Data

US 2018/0239767 A1    Aug. 23, 2018

(51) Int. Cl.
*G06F 16/438* (2019.01)
*G06F 16/901* (2019.01)

(52) U.S. Cl.
CPC ...... *G06F 16/4393* (2019.01); *G06F 16/9024* (2019.01)

(58) Field of Classification Search
CPC ............. G06F 16/4393; G06F 16/9024; G06F 16/9535; G04L 51/32
USPC ................... 707/733, 734; 709/217; 715/753
See application file for complete search history.

(56) References Cited

U.S. PATENT DOCUMENTS

| 9,147,008 | B2 | 9/2015 | Griffin |
| 9,454,646 | B2* | 9/2016 | Siefert ................. G09B 5/10 |
| 9,715,495 | B1* | 7/2017 | Tacchi ............... G06F 17/2785 |
| 9,740,368 | B1* | 8/2017 | Love .................. G06F 3/04817 |
| 10,401,860 | B2* | 9/2019 | Krupat ................ A61B 5/0077 |
| 2007/0214141 | A1 | 9/2007 | Sittig, et al. |
| 2008/0114714 | A1 | 5/2008 | Venturi |
| 2012/0290950 | A1* | 11/2012 | Rapaport ............... H04L 51/32 715/753 |
| 2015/0296033 | A1* | 10/2015 | Jung ..................... G06Q 50/01 709/217 |
| 2016/0019298 | A1* | 1/2016 | Brodie ............... G06F 16/9535 707/734 |
| 2018/0189691 | A1* | 7/2018 | Oehrle .................. G06N 7/005 |

* cited by examiner

*Primary Examiner* — Dung K Chau
(74) *Attorney, Agent, or Firm* — James Nock, Esq.; George S. Blasiak, Esq.; Heslin Rothenberg Farley & Mesiti, PC

(57) ABSTRACT

Methods, computer program products, and systems are presented. The method computer program products, and systems can include, for instance: processing social media system data to establish a relationship graph, wherein the processing includes aggregating relationship graph information of different relationship graphs so that the relationship graph is an aggregated relationship graph; determining that a user is encountering cognitive recall difficulty, wherein the determining includes comparing current input biometric data of the user to baseline biometric data of the user; and responsively to the determining, outputting to the user media content, wherein generating the media content includes performing a search of one or more data source for content using node labels of the relationship graph as keywords and providing a media file for playback by the user, the media file having content returned from the search.

20 Claims, 9 Drawing Sheets

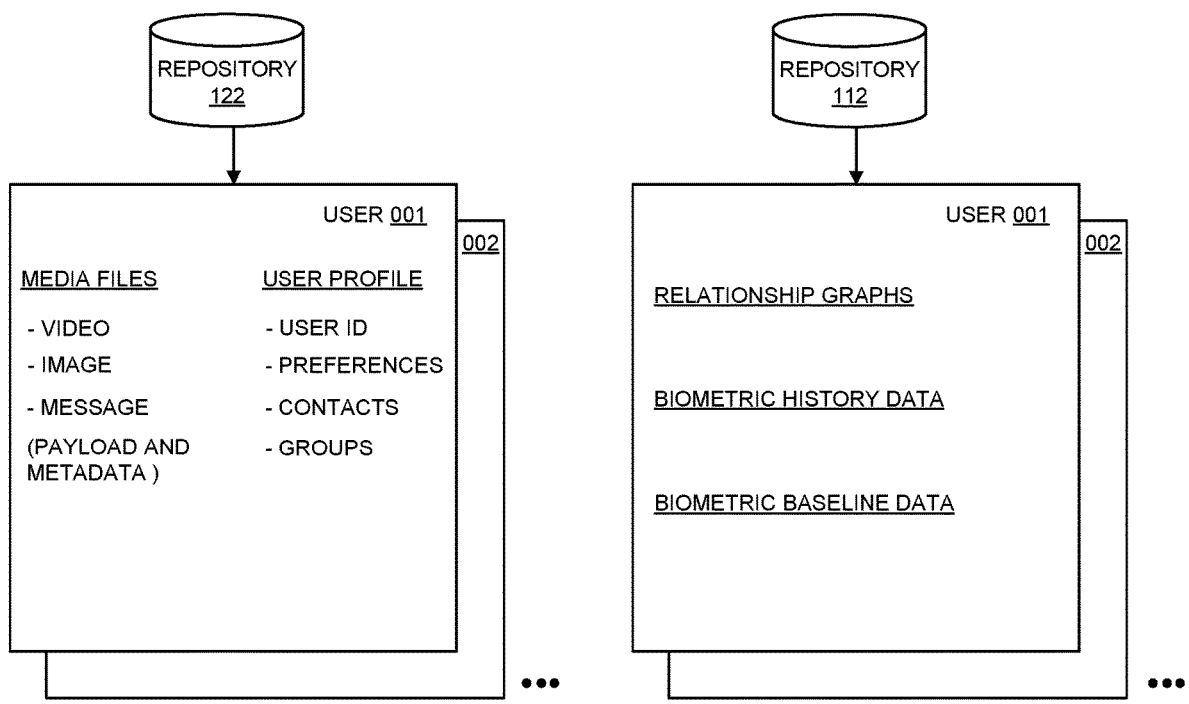

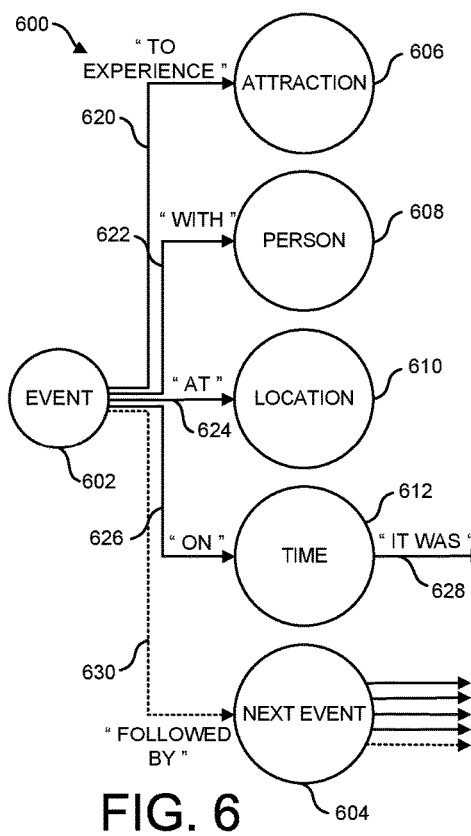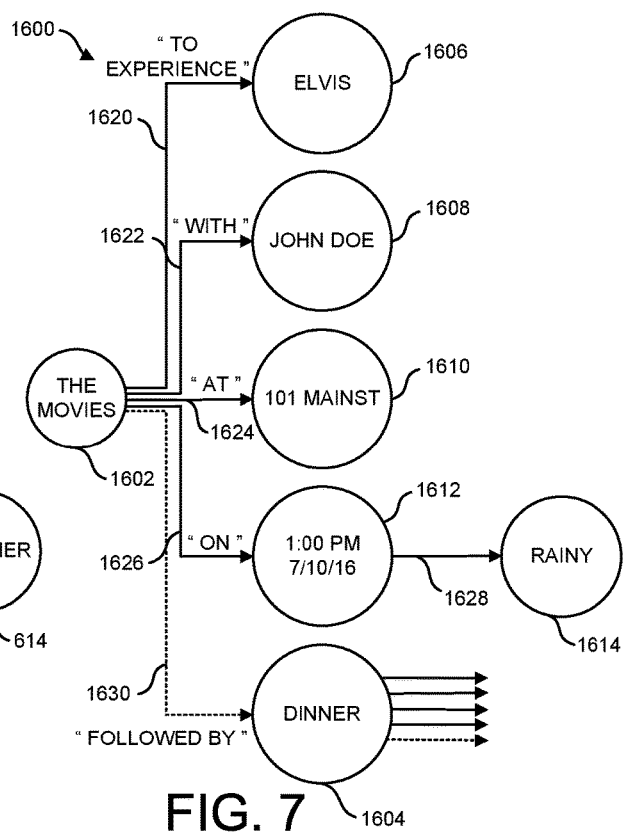
FIG. 6
FIG. 7

COMPUTERIZED COGNITIVE RECALL ASSISTANCE

BACKGROUND

The present disclosure relates to computer artificial intelligence and particularly to computer implemented system for providing cognitive recall assistance to users.

A relationship graph can be used to define and describe structured data. A relationship graph can include nodes (often depicted with a circle or square) and edges often depicted with lines between node depicting shapes. Edges between nodes can be unidirectional, bi-directional, or non-directional. An edge can define a relationship between nodes. In some instances an edge can specify an attribute of a node. In some instances an edge can specify a relationship other than an attribute. Relationship graphs can be used to organize stored data.

SUMMARY

Shortcomings of the prior art are overcome, and additional advantages are provided, through the provision, in one aspect, of a method. The method can include, for example: processing social media system data to establish a relationship graph, wherein the processing includes aggregating relationship graph information of different relationship graphs so that the relationship graph is an aggregated relationship graph; determining that a user is encountering cognitive recall difficulty, wherein the determining includes comparing current input biometric data of the user to baseline biometric data of the user; and responsively to the determining, outputting to the user media content, wherein generating the media content includes performing a search of one or more data source for content using node labels of the relationship graph as keywords and providing a media file for playback by the user, the media file having content returned from the search.

In another aspect, a computer program product can be provided. The computer program product can include a computer readable storage medium readable by one or more processing unit and storing instructions for execution by one or more processor for performing a method. The method can include, for example: processing social media system data to establish a relationship graph, wherein the processing includes aggregating relationship graph information of different relationship graphs so that the relationship graph is an aggregated relationship graph; determining that a user is encountering cognitive recall difficulty, wherein the determining includes comparing current input biometric data of the user to baseline biometric data of the user; and responsively to the determining, outputting to the user media content, wherein generating the media content includes performing a search of one or more data source for content using node labels of the relationship graph as keywords and providing a media file for playback by the user, the media file having content returned from the search.

In a further aspect, a system can be provided. The system can include, for example a memory. In addition, the system can include one or more processor in communication with the memory. Further, the system can include program instructions executable by the one or more processor via the memory to perform a method. The method can include, for example: processing social media system data to establish a relationship graph, wherein the processing includes aggregating relationship graph information of different relationship graphs so that the relationship graph is an aggregated relationship graph; determining that a user is encountering cognitive recall difficulty, wherein the determining includes comparing current input biometric data of the user to baseline biometric data of the user; and responsively to the determining, outputting to the user media content, wherein generating the media content includes performing a search of one or more data source for content using node labels of the relationship graph as keywords and providing a media file for playback by the user, the media file having content returned from the search.

Shortcomings of the prior art are overcome, and additional advantages are provided, through the provision, in one aspect, of a method. The method can include, for example: processing system data to establish a relationship graph; determining that a user is encountering cognitive recall difficulty; and responsively to the determining presenting to the user media content, the media content being generated using the relationship graph.

In another aspect, a computer program product can be provided. The computer program product can include a computer readable storage medium readable by one or more processing unit and storing instructions for execution by one or more processor for performing a method. The method can include, for example: processing system data to establish a relationship graph; determining that a user is encountering cognitive recall difficulty; and responsively to the determining presenting to the user media content, the media content being generated using the relationship graph.

In a further aspect, a system can be provided. The system can include, for example a memory. In addition, the system can include one or more processor in communication with the memory. Further, the system can include program instructions executable by the one or more processor via the memory to perform a method. The method can include, for example: processing system data to establish a relationship graph; determining that a user is encountering cognitive recall difficulty; and responsively to the determining presenting to the user media content, the media content being generated using the relationship graph.

The media content referred to in connection with methods, computer program products and systems set forth herein can be media content generated to assist a user in overcoming cognitive recall difficulty. The media content can be media content dynamically generated and displayed to the user in context to assist the user in overcoming cognitive recall difficulty.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts content of a social media system data repository in one embodiment;

FIG. 3 depicts content of a manager system data repository in one embodiment;

FIGS. 6-8 are depictions of relationship graphs according to one embodiment;

DETAILED DESCRIPTION

Figure 1:
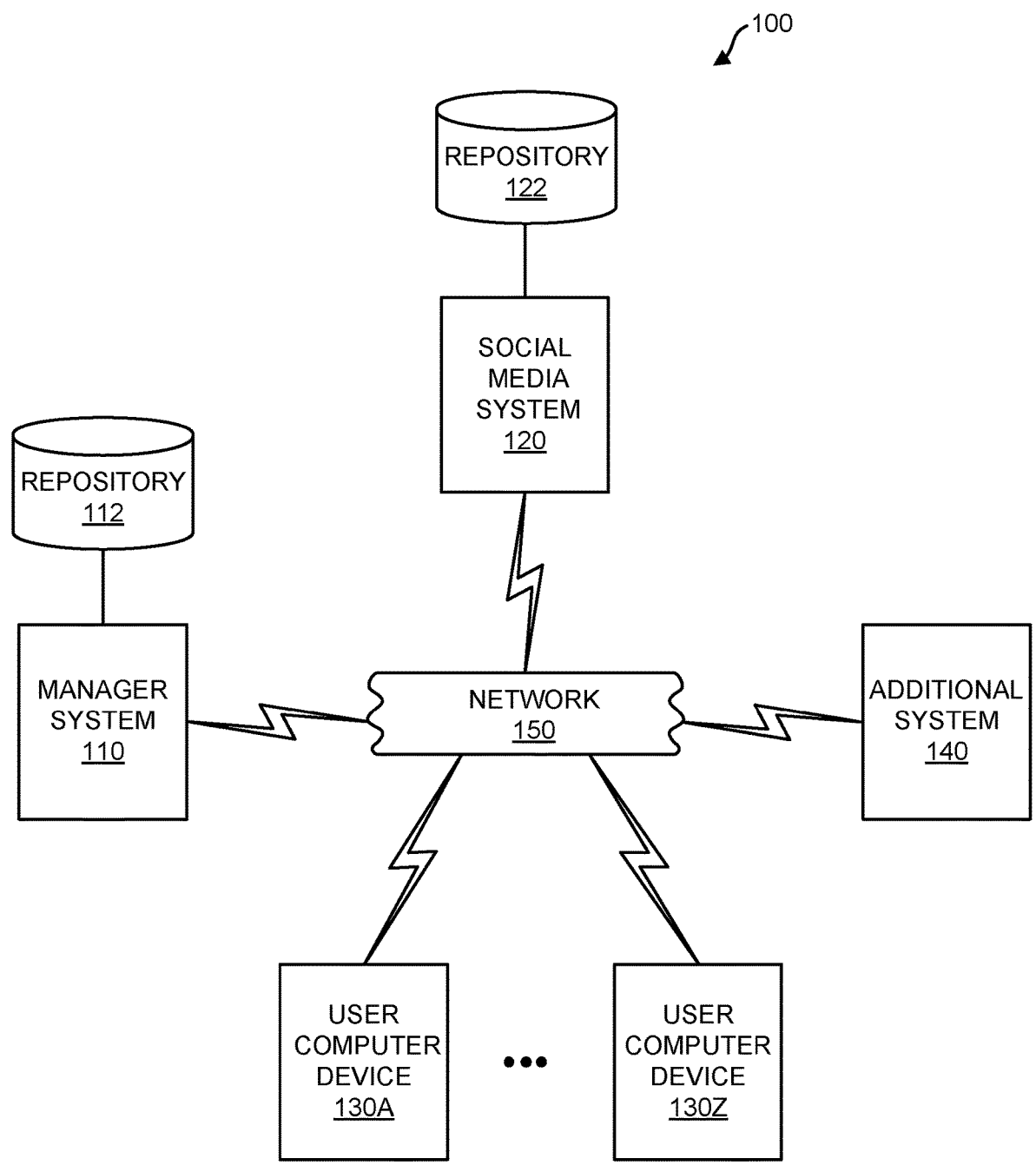
FIG. 1 depicts a system having manager system and a social media system in one embodiment.

FIG. 1 is a block diagram of a system 100, in accordance with an embodiment as set forth herein. In the embodiment of FIG. 1, system 100 includes numerous devices, which may be or include computing nodes 10 as described herein, connected by a network 150. For example, network 150 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 1 depicts an example environment. In one embodiment, system 100 can include a manager system 110, social media system 120 one or more user computer device 130A-130Z and one or more additional system 140. Each of the different user computer devices 130A-130Z can be associated to a different user. User history data can be stored in data repository 122 of social media system 120. In one embodiment system 100 can include one or more social media system in addition to social media system 120. In one embodiment manager system 110 can be external to social media system 120 and to each of the one or more user computer device 130A-130Z. In one embodiment manager system 110 can be co-located with social media system 120 or another social media system. In one embodiment manager system 110 can be co-located with one or more user computer device 130A-130Z.

Regarding one or more user computer device 130A-130Z, a computer device of one or more user computer device 130A-130Z in one embodiment can include a computing node 10 provided by a client computer, e.g. a mobile device, e.g. a smartphone or tablet, a laptop or PC that runs one or more program including a web browser for browsing web pages.

With further reference to FIG. 1, social media system 120 can include an associated data repository 122. In another aspect manager system 110 can include an associated data repository 112. Social media system 120 can include a collection of files, including for example, HTML files, CSS files, image files, and JavaScript files. Social media system 120 can include social media website accessible on the Internet by user computer devices 130A-130Z.

Repository 122 of social media system 120 can include user data for various users, e.g. users 001, 002, etc. As illustrated in FIG. 2, repository 122 can store for each of several users, 001, 002, etc., such content as media files and user profile data. Media files can include e.g. video files, image files, and text based message files. The stored media files can include posted content of a user posted to social media website. Media files of a user can include payload data as well as metadata. System 100 can include metadata tagging functionality so that files stored in repository 122 are automatically tagged with metadata, e.g., that specifies such data as geographic location, a timestamp, filename identifiers and person identifiers associated to a file. User profile data of repository 127 can include e.g. user ID, preferences, contacts (e.g. "friends", "connections") and groups of a user.

Repository 112 associated to manager system 110 can store such content for each of several users as relationship graphs, biometric history data and biometric baseline data. Manager system 110 can process data of social media system 120 to establish relationship graphs. Biometric history data can include, e.g. typing input data, audio input data, heart rate data, blood pressure data, and facial recognition data. Biometric history data can include data of the history of usage of a user in entering data into system 100, e.g., posting content to a social media website using a user interface of a user computer device 130A. Biometric baseline data can be data determined by examining of biometric history data. Manager system 110 can be configured so that manager system 110 periodically examines biometric history system data of repository 112 to determine biometric baseline data of a user. Biometric baseline data can include, e.g. typing input data, audio input data, heart rate data, blood pressure data, and facial recognition data. Biometric baseline data can provide a baseline for comparison of current biometric data. In one embodiment, manager system 110 can run Natural Language Processing (NLP) process. An NLP process can include topic analysis for output of topic classification parameters that can be tagged to text or other media samples subject to processing. An NLP process can include topic segmentation to identify several topics within a message. Topic analysis can apply a variety of technologies e.g. one or more of hidden mark model (HMM), artificial chains, passage similarities using word co-occurrence, topic modeling, or clustering.

Figure 4:
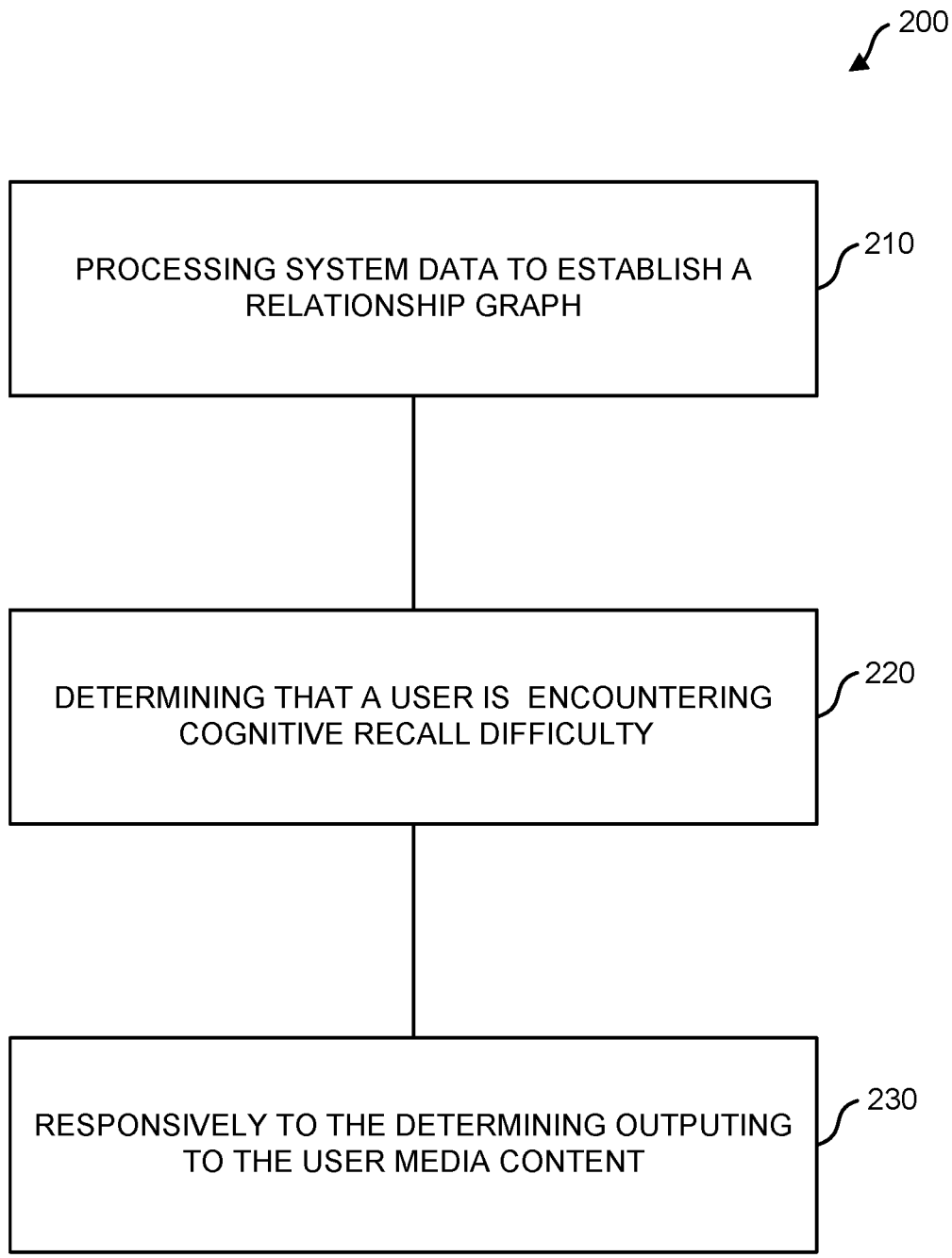
FIG. 4 depicts a flowchart illustrating method for use in cognitive recall assistance in one embodiment.

FIG. 4 is a flowchart illustrating a method 200 in accordance with one or more aspects set forth herein. At block 210 method 200 can include processing system data to establish a relationship graph. At block 220 method 200 can include determining that a user is encountering cognitive recall difficulty; and at block 230 method 200 can include responsively to the determining outputting to the user media content, the media content being generated using the relationship graph.

The media content output at block 230 can be media content generated to assist a user in overcoming cognitive recall difficulty. The media content generated and output can be media content depicting a past event or related to a past event. The past event can be an event that determined to be in common with an event determined to be referenced in a current conversation e.g. a text based conversation.

In one aspect the media content output for assisting a user in overcoming cognitive recall difficulty can be dynamically generated so that different media content can be generated for different users. In one aspect the media content output for assisting a user in overcoming cognitive recall difficulty can be dynamically generated so that different media content can be generated for different events. In one aspect the media content output for assisting a user in overcoming cognitive recall difficulty can be dynamically generated so that different media content can be generated at different times.

System 100 can provide the ability to establish a relationship graph defining the relationship of events for a given user. System 100 can aggregate relationship graph information of different users, e.g., by aggregating relationship graphs using common events experienced by different users. System 100 can provide the ability to determine if a user has forgotten information during the course of using system 100. System 100 can use different input mechanisms (e.g. by examining facial expressions represented in camera output image data, examining pulse/blood pressure data output from pulse or blood pressure devices, text communication data output by a keyboard, etc.), and can predict the appropriate event thread in the relationship graph. System 100 can dynamically generate media content containing relevant social media content (e.g. content of video files, image files and/or text based message files) to help the user cognitively recall memory of an event and related events.

Figure 5:
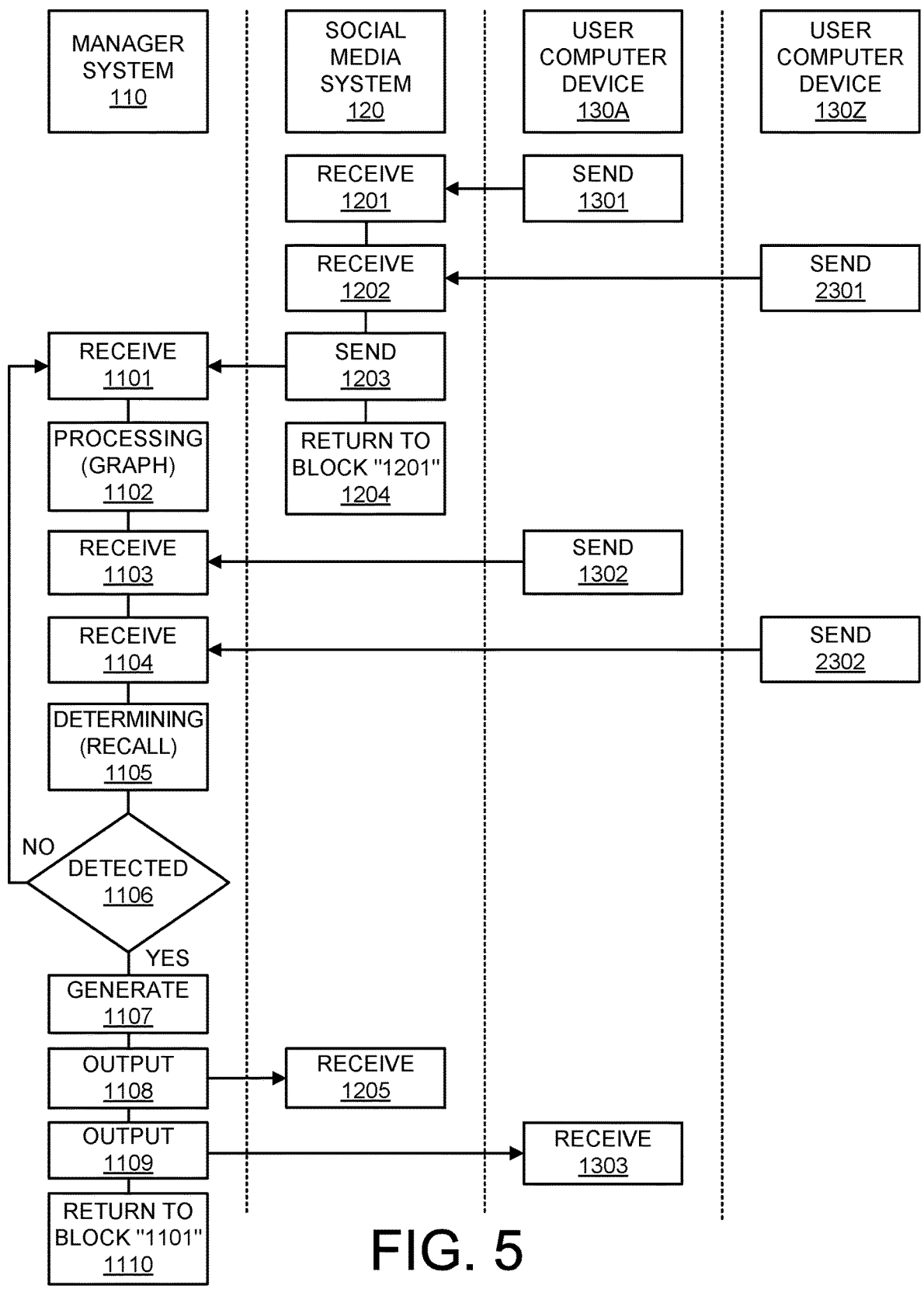
FIG. 5 is a flowchart depicting a method for use in cognitive recall assistance in one embodiment.

A flowchart illustrating in one embodiment operation of system 100 is shown in FIG. 5, wherein exemplary functions are described with respect to manager system 110, social media system 120 and first and second user computer devices 130A and 130Z used by first and second different users. Functions of manager system 110 described in reference to FIG. 5 set forth exemplary functions in accordance with method 200 as set forth in connection with the flowchart of FIG. 4 in one embodiment.

At block 1301 and block 2301 first and second users can send information to social media system 120 using respectively first and second computer devices 130A and 130Z. Users can engage in social network interactions (e.g. text posts/responses, text chats, video file sharing, image file sharing, etc.) about events. Social media system 120 can allow users to post content (i.e. text based messages, image files, video files). Social media system 120 in repository 122 can store various media content that has been posted by users (e.g. video files, image files, and/or text based message files). Such stored files can be tagged with metadata describing the files with information such as time, location, person, and/or filename.

At block 1102 manager system 110 can process data of social media system 120 to establish a relationship graph. For obtaining data for processing at block 1102, social media system 120 at block 1203 can send data for processing which data can be received by manager system 110 at block 1101. In one embodiment, blocks 1201-1203 can be continually repeated as indicated by return block 1204.

For establishing a relationship graph, manager system 110 can use a template graph, an example of which is shown in FIG. 6. Manager system 110 can use a template graph to establish an instance of the template graph and the instance of a template graph can define a relationship graph. Template graph 600 can be a data structure defining relationships between events and other events and between events and attributes of events. As set forth herein template graph can key the transformation of unstructured data, e.g. content of video files, image files, and/or text based message files into structured data for use in an artificial intelligence platform that intellectually determines content for triggering cognitive recall. In the exemplary template graph of FIG. 6 template graph 600 can include event nodes 602 and 604 and attribute nodes 606, 608, 610, 612, and 614. Template graph 600 can include first edges 620, 622, 624, 626, and 628 defining attribute relationships and second edge 630 defining a temporal relationship. Each edge can include a label that specifies relationships between nodes. In the example given the edges can be "to experience" (an attraction at an event), "with" (persons attended with), "at" (location of the event), "on" (time including date of the event), "it was" (weather at a specified time) and "followed by" (the next event). Manager system 110 in one event can terminate a relationship graph for certain user if a next event cannot be located and can responsively to termination of a relationship graph can establish a new relationship graph for the certain user. An event herein in one embodiment can refer to a planned social occasion e.g. an entertainment event, a meal event, a shopping trip event.

For using template graph 600 to establish a relationship graph manager system 110 can determine an instance of template graph 600 which define a relationship graph. Manager system 110 can search data of repository 122 according to a process that is based on the template graph 600. For example, processing a set of data of repository 122 posted within a specified time window, manager system 110 can search for events. For example manager system 110 can search for text based phrases indicative of an event e.g. "going to the," "going," "the game," "out to the," "at the," and the like. Manager system 110 for identifying an event can also search posted image or video files for significant landmarks that can be determined to be significant by cross referencing to an external one or more additional system 140, e.g., to public landmark databases. Manager system 110 for identifying an event can also recognize crowd scenes (indicative of an event) in posted image or video files. Manager system 110 can be configured to employ image analytics and semantic analysis on photos to identify an event (i.e. game, concert, dinner outing, birthday, picnic, business meeting, shopping trip etc.). Manager system 110 can also perform facial and object recognition. Manager system 110 can also be configured to extract keywords from content to determine semantic relationships among keywords representing events. The searching for events processing a set of data of repository 122 can include processing posted content e.g. video files, image files, and/or text based messages of a certain user of social media system 120.

With an event identified, manager system 110 can proceed to identify (e.g. using various processing methods including e.g. activation of an NLP process) attribute and temporal nodes associated to an event using the relationship indicated by the edges of template graph 600. By processing text based message files, image files and/or video files of data repository 122 manager system 110 can identify one or more item "to experience" (an attraction at an event) in relation to an identified event, one or more person "with" (a person attended with) in relation to an identified item, the location of an event (the "at" edge), weather (the "it was" edge) associated with an event and a time of the event (the "on" edge), and can then proceed to identify a next event experienced by the current user for whom the relationship event is being determined (the "followed by" edge). Such processing of video files, image files, and/or text based message files of data repository 122 by manager system 110 can include processing of video files, image files, and/or text based message files of a certain user of social media system 120. Manager system 110 can determine a "to experience" attribute e.g. by examining text based content posted by a user and/or by recognizing items (e.g. famous people) in promotional image files and or video files. Manager system 110 can determine "with" attribute (person attended with) attribute e.g. by examining text based content posted by a user and/or by recognizing persons represented in image files and or video files related to the event. It will be seen that manager system 110 can often determine "at" and "on" attributes by reading metadata associated with a posted image or video file. Manager system 110 can look up weather conditions from an external database e.g. of one or more additional system 140 using a time and location of an event. In one embodiment using the template graph 600 of FIG. 6 manager system 110 can determine a graph instance as depicted in FIG. 7 that defines a relationship graph for a particular user, and a particular event. The graph depicted in FIG. 7 can include instance nodes 1602, 1604, 1606, 1608, 1610, 1612, and 1614 corresponding to nodes 602, 604, 606, 608, 610, 612, and 614 and instance edges 1620, 1622, 1624, 1626, 1628, and 1630 corresponding to edges 620, 622, 624, 626, 628, 630 of template graph 600 of FIG. 6.

Figure 8:
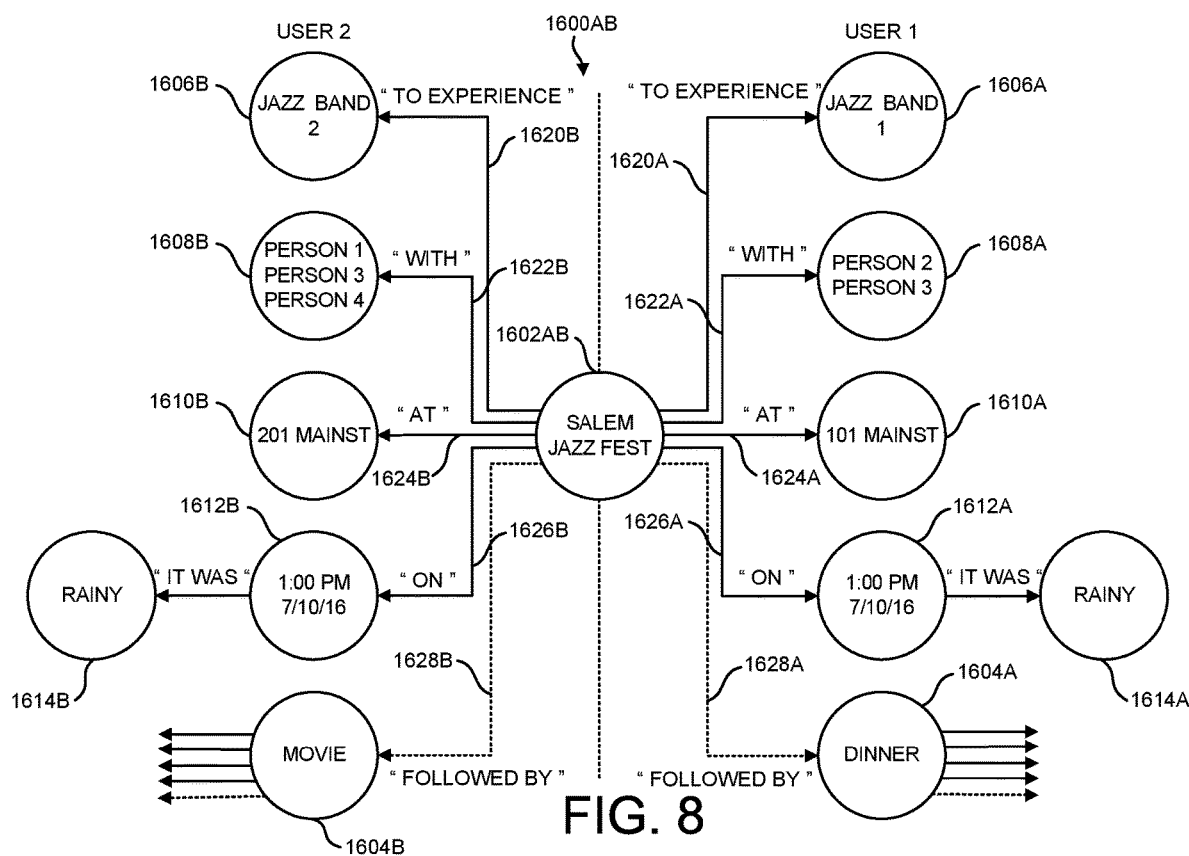

Manager system 110 for processing system data to establish a relationship graph can aggregate relationship graph information of individual users so that a determined relationship graph is an aggregated relationship graph. In one embodiment, a node of an aggregated relationship graph can be a shared common event node specifying an event commonly experienced by first and second users of (and potentially up to Mth users) of social media system 120. A depiction of an aggregated relationship graph provided using template graph 600 (FIG. 6) is illustrated in FIG. 8. In the example FIG. 8 relationship graph 1600AB is an aggregated relationship graph combining relationship graphs of a first user (user 1) and a second user (user 2). Data of the first user is shown on the right side of FIG. 8 and data of a second user is shown on the left side of FIG. 6. Manager system 110 can determine slightly different data when establishing relationship graph information using data of second user rather than a first user, thus, it is seen that relationship graph information for the different users can have different information attributable to different perspectives of a common event. For example, manager system 110 may determine different attractions for the different instance nodes 1606A and 1606B. Instance nodes 1608A and 1608B can have different sets of people identified as persons attended "with", and a next event specified in instance nodes 1604A and 1604B can be differentiated between different relationship graph sections (relationship graph information of different users) that can be aggregated to define an aggregated relationship graph. Also, different locations (e.g. designating different entrances of a location) may be specified by respective nodes 1610A and 1610B. Manager system 110 can apply rules based criteria for determining common event nodes to be used as a basis for aggregating relationship graphs. For example, in one embodiment, manager system 110 is enabled and qualified to aggregate a relationship graph (relationship graph information) of a second user to a relationship graph (relationship graph information) for a first user using a common event that commonly specifies a common node if the second user is identified as a person attended "with" ("with" edge) in the first user's relationship graph. There is set forth herein a method including aggregating relationship graph information of a first user and relationship graph information of a second user to define a relationship graph wherein the aggregating includes applying rules based criteria, and wherein according to the rules based criteria the relationship graph information of the second user is qualified for aggregating with the relationship graph information of the first user conditionally on the condition that a node of the relationship graph information of the first user specifies the second user.

Manager system 110 as set forth in connection with FIG. 8 can provide an aggregated relationship graph by combining relationship graph information of first and second different users. Such combining can be regarded as crowdsourcing for the reason that data of different users can be utilized. In another embodiment, manager system 110 can provide an aggregated relationship graph by combining relationship graph information of a common user. For example, a relationship graph for a certain user in one embodiment can have the form of relationship graph 1600 of FIG. 7. It will understood that manager system 110 can provide second relationship graph for a certain user similar to the relationship graph 1600 unlinked to relationship graph 1600 but for a different event. Manager system 110 can combine and aggregate information of the relationship graph 1600 for a certain user and information of a second relationship graph information of the certain user to provide an aggregated relationship graph, e.g. by establishing a "with" node of the respective relationship graphs (if specifying a common person) as a shared node of the provided aggregated relationship graph having relationship graph information of different relationship graphs of a common user.

At block 1105 manager system 110 can perform determining that a user is encountering cognitive recall difficulty. Performing determining that a user is encountering cognitive recall difficulty can be regarded as predicting that a user is encountering cognitive recall difficulty. For obtaining data for use in determining at block 1105, social media system 120 at block 1203 can send data for processing which data can be received by manager system 110. Such data sent at block 1203 by social media system 120 can be user defined data sent by one or more user computer device 130A and 130Z at blocks 1301 and 2301 and received from one or more user computer device 130A and 130Z by social media system 120 at blocks 1201 and 1202 respectively. The user defined data can be user defined text based message data and/or input biometric data of a user as set forth herein. Alternatively or in addition, manager system 110 for performing determining at block 1105 can receive user defined data from one or more user computer device 130A or 130Z. For obtaining data for processing at block 1105 one or more or user computer device 130A and/or user computer device 130Z at blocks 1302 and 2302 can send user defined data for processing which data can be received by manager system 110 at blocks 1103 and 1104 respectively. The user defined data can be user defined text based message data and/or input biometric data of a user as set forth herein. In one embodiment, as indicated by blocks 1302 and 2302 user defined data used by manager system 110 for determining at block 1105 can be user defined data that is external from and never sent to social media system 120. User defined data used by manager system 110 for determining at block 1105 can be e.g. user defined data that is entered into a user computer device when a user is using a messaging system external to social media system 120. User defined data used by manager system 110 for determining at block 1105 can be e.g. user defined data that is entered into a user computer device when a user is using a standalone application running on the user computer device having no relationship to social media system 120.

For determining that a user is encountering cognitive recall difficulty at block 1105, manager system 110 can examine current input biometric data of a user. Biometric data of a user can include e.g. typing input data of a user, audio input data of a user, heart rate data of user, blood pressure data of a user and/or facial expression data of a user. As set forth herein a user computer device 130A-130Z can have various input devices for use in performance of such examining e.g., a keyboard such as a physical or virtual keyboard, an audio input device, a pulse sensor device, a blood pressure sensor device and/or a camera for use in obtaining of image data for performance of facial recognition processing.

At block 1105 manager system 110 can compare current input biometric data of a user to baseline biometric data for the user. Embodiments herein recognize that biometric data that is irregular for a first user can be regular for a second user. For determining that a user is encountering cognitive recall difficulty manager system 110 can identify deviations of current input biometric data from a user from a baseline biometric data of a user. In one embodiment, if current input biometric data for a user deviates from baseline biometric data of the user by a threshold amount, manager system 110 can determine that a user is encountering cognitive recall difficulty.

In one embodiment, manager system 110 can determine that a user is encountering cognitive recall difficulty if current typing input data of a user deviates from baseline typing data for the user by a threshold amount. For example, where a user is ordinarily a fast typist exhibits delay in typing, manager system 110 can recognize the deviation as an indicator of cognitive recall difficulty. Manager system 110 for determining that a user is encountering cognitive recall difficulty can examine a variety of typing input data e.g. a user's interaction level with other participating parties (i.e. detail level of post, frequency of post, etc.) delayed response to communication for more than threshold limit of time. In one embodiment, manager system 110 can determine that a user is encountering cognitive memory recall difficulty if current audio input data of a user deviates from baseline audio data for the user by a threshold amount. For example, where a user who ordinarily does not use filler words such as "ah" or "um" uses such words, manager system 110 can recognize the deviation as an indicator of cognitive memory recall difficulty. In one embodiment, manager system 110 can determine that a user is encountering cognitive memory recall difficulty if current heart rate data of a user deviates from a baseline heart rate data for the user by a threshold amount. In one embodiment, manager system 110 can determine that a user is encountering cognitive memory recall difficulty if current blood pressure data of a user deviates from baseline blood pressure data for the user by a threshold amount. In one embodiment, manager system 110 can determine that a user is encountering cognitive memory recall difficulty if facial expression data of a user deviates from baseline facial expression data for the user by a threshold amount. For example, where a user who ordinarily does not exhibit a furrowed brow exhibits a furrowed brow, manager system 110 can recognize the deviation as an indicator of cognitive memory recall difficulty. Manager system 110 in one embodiment can monitor facial expression to determine if user has forgot and in need of assistance. Manager system 110 in one embodiment can monitor heart rate and or blood pressure to determine if they have forgot and need assistance. For example, someone users may forget and get frustrated raising heart rate and/or blood pressure.

Manager system 110 can be configured to calibrate baseline biometric data on a regular basis e.g. at predetermined (e.g. daily) intervals. Determining baseline biometric data for a user can include averaging instances of biometric data received for a user. In one embodiment system 100 can employ machine learning processing so that baseline biometric data is periodically updated to provide an accurate prediction of expected biometric characteristics of a user. Machine learning processing can include e.g. periodically automatically updating baseline biometric data for a user by inclusion of newly obtained data values in the calculation of a running average. Machine learning processing can include e.g. periodically automatically updating baseline biometric data for a user by inclusion of newly obtained data values in the calculation of a running average and by using sliding time window processing where aged data values beyond a threshold age are discarded. Machine learning processing can include e.g. periodically automatically updating baseline biometric data for a user by inclusion of newly obtained data values in the calculation of a running average and by applying weights to values to so that more recent data is weighted more heavy than less recent aged data.

In one embodiment, for determining that a user is encountering cognitive memory recall difficulty at block 1105, manager system 110 can examine content of text based messages between first and second users for indicators that a user has forgotten information of an event. For example, manager system 110 can monitor for such forgetfulness indicating text based phrases such as "I forgot", "what was the name of" "I don't remember" and the like.

In one embodiment, for determining that a user is encountering cognitive memory recall difficulty at block 1105, manager system 110 can examine that status of a flag that can be affirmatively raised by a user to indicate that user has forgotten information of an event. In one embodiment system 100 can be configured so that user using a user interface of computer device e.g. computer device 130A can affirmatively indicate that a user has forgotten information of an event. Manager system 110 can be configured to monitor the status of such flag for determining that the user is experiencing cognitive recall difficulty. The affirmatively raised memory recall flag can be tied to the context of current discussion e.g. a topic being discussed in a text based conversation between users of social media system 120 including the user raising the cognitive recall difficulty flag so that the cognitive recall difficulty applies to an event that is referenced in a current conversation involving the user raising the cognitive recall difficulty flag. The affirmatively raised cognitive recall flag can have a timeout period so that the indicated status is no longer valid after a timeout period, e.g. of 1 minute or ten minutes or another time period.

As indicated by "detected" decision block 1106 manager system 110 on determining that a user is encountering cognitive recall difficulty can proceed to block 1107 to generate media content for assisting the user. Manager system 110 can return to block 1101 if a user is not determined to be experiencing cognitive recall difficulty and manager system 110 can repeatedly perform blocks 1101-1106 until a user is determined to be encountering cognitive recall difficulty. Manager system 110 at block 1108 and/or 1109 can output media content responsively to determining that a user is encountering cognitive memory recall difficulty. The output media content output at block 1108 and/or block 1109 can be media content generated at block 1107. The output media content can be output for presentment on an output device, e.g. a display of a user's computer device e.g. computer device 130A. For example when manager system 110 determines that a first user using computer device 130A is encountering cognitive memory recall difficulty, manager system 110 can output media content for playback on a computer device 130A, e.g. by outputting media content to social media system 120 (block 1108) so that the content is accessible by a user using computer device 130A and/or by outputting media content to user computer device 130 (block 1109) in a manner bypassing social media system 120. Media content output at block 1108 can be received by social media system 120 for playback by user computer device 130A at block 1205. Media content output at block 1109 can be received by computer device 130A for playback at block 1303.

For generating media content for output at block 1108 and/or block 1109 manager system 110 can use the relationship graph established at block 1102. For performance of block 1102 in our embodiment manager system 110 can create a video of forgotten information to assist in cognitive recall.

Manager system 110 can search for appropriate content (e.g. video content, image content, and/or text content) using a generated relationship graph which can be generated at block 1102. Manager system 110 may have generated and stored many relationship graphs in repository 122. A relationship graph used by manager system 110 can be based on the user determined to be encountering cognitive memory recall difficulty and can be based on the context of a current conversation e.g. a current text based conversation being engaged in by a first user and a second user. Manager system 110 when determining that a user is encountering cognitive memory recall difficulty can be monitoring a context of a current conversation, e.g. including by activation of an NLP process. When a user is determined to be encountering cognitive memory difficulty manager system 110 can select a relationship graph of the user having a node label in common with a topic determined by manager system 110 to be referenced during the current conversation. For example, manager system 110 can identify a topic of a current conversation corresponding to an identified event that is specified as an event node label or other node label in a relationship graph of the user for whom cognitive memory recall difficulty. The relationship graph can be aggregated or un-aggregated.

Manager system 110 can use various content e.g. video file content, image file content and/or text based message file content of repository 122, and/or content of one or more additional system 140 to generate media content for output at block 1108 and/or block 1109. The media content for output can be in the format of, e.g., a video file to assist the user in the recall of the forgotten incident of the past to help the user to assist in recall of cognitive memory. In using a relationship graph for generating media content for output at block 1107 manager system 110 can identify content for inclusion in generated media content for output based on content (e.g. labels of nodes and/or edges) of the relationship graph. Content included in generated media content for output can be different from content used to determine nodes of the relationship graph. For example, referring to relationship graph 1600 of FIG. 7 where a person is identified by a node label at node 1608 manager system 110 for generating media content for output can include image file depictions of the person (John Doe) stored in repository 122 other than a depiction yielding the determination that the person should be specified in node 1608. In one embodiment manager system 110 for performing processing at block 1102 to generate a relationship graph can limit content examined to content of social media system 120 and for performing generating at block 1107 can examine content of an expanded set of data sources e.g. including content of one or more additional system 140 as well as content of social media system 120. For generating media content at block 1107 for output at block 1108 and/or 1109, manager system 110 can organize content using nodes of a relationship graph. For example, manager system 110 can identify text terms of a current conversation involving a user referencing an identified event that is specified as an event node label in a relationship graph of the user for whom cognitive memory recall difficulty is being monitored. Where the identified event is the event specified by a label of event node 1602 of relationship graph 1600 of FIG. 7, manager system 110 can select relationship graph 1600 for use in generating media content for output. A node e.g. event node 1602 in the example described having a label matching a topic identified by examining content of a current conversation can be regarded as a primary node. A primary node can be an event node of a selected relationship graph as in the described example or another node of the relationship graph matching an identified topic of a current conversation.

Manager system 110 for performing generating at block 1107 can initially identify a relationship graph having a primary node having a label that matches (according to a matching criteria that may not specify an exact match) an identified topic identified by examining data of a current conversation For examining data of a current conversation manager system can run an NLP process to determine topic classifiers for content of a current conversation. On identification of a relationship graph e.g. relationship graph 1600 having a node label that matches a topic of current conversation manager system 110 for performance of generating at block 1107 can activate a search engine process using node labels as keywords to search for content associated to the node labels. The search engine search in one embodiment can be limited to content of repository 122 of social media system 120. In one embodiment the search for content can include an Internet search encompassing searches of one or more additional system 140. In response to activation of a search engine process using relationship node labels as keywords manager system 110 can store various returned content into data repository 112, for example video content, image content, and/or text content. Manager system 110 can index the stored content returned by a search engine search by filename and file directory. Manager system 110 can provide an ordered list of the indexed content files, the order specifying order of playback of content of the various filed.

Referring to relationship graph 1600, manager system 110 can specify for inclusion in generated media content for output content (e.g. video content, image content, and/or text content) depicting an event specified by a node label of node 1602 and can specify for inclusion content (e.g. video content, image content, and/or text content) depicting an attraction specified by node 1606 and can specify for inclusion content (e.g. video content, image content, and/or text content) depicting a person specified by node 1608 and can specify for inclusion content (e.g. video content, image content, and/or text content) depicting weather specified by node 1616 and can specify for inclusion content (e.g. video content, image content, and/or text content) depicting a next event specified by node 1604. Manager system 110 can extract data e.g. from social media system 120 and/or from one or more additional system 140 when specifying content for inclusion in generated media content, e.g. a depiction of an event or attraction from a publicly accessible database. When all items have been specified for inclusion in generated media content for output, manager system 110 can assemble (e.g. can format a video file for) the content. In one embodiment manager system 110 for generating a media file at block 1107 can activate an automated video editor process that automatically generates a video file having content of the indexed content files according to the order of the ordered list. The ordered list in addition to specifying an order of content for playback can specify time periods and times for playback for content of the various content files. In one embodiment playback times for content obtained corresponding to a triggering node of the relationship graph triggering selection of the relationship graph can be longer than for content obtained corresponding to related nodes. Table A sets forth video formatting information for a video file generated using relationship graph 1600 of FIG. 7, where the primary node matching a topic of a current conversation and triggering selection of the relationship graph is event node 1602.

TABLE A

| Video segment order | Time period of video segment (seconds) | Description of segment content |
|---|---|---|
| 01 | 0-5 | Returned first content from search using the label of node 1602 as a keyword |
| 02 | 5-7 | Return first content from search using the label of node 1604 as a keyword |
| 03 | 7-9 | Return first content from search using the label of node 1606 as a keyword |
| 04 | 9-11 | Return first content from search using the label of node 1608 as a keyword |
| 05 | 11-13 | Return first content from search using the label of node 1610 as a keyword |
| 06 | 13-15 | Return first content from search using the label of node 1612 as a keyword |
| 07 | 15-16 | Return first content from search using the label of node 1614 as a keyword |
| 08 | 16-21 | Returned second content from search using the label of node 1602 as a keyword |
| 09 | 21-23 | Return second content from search using the label of node 1604 as a keyword |
| 10 | 23-25 | Return second content from search using the label of node 1606 as a keyword |
| 11 | 25-27 | Return second content from search using the label of node 1608 as a keyword |
| ... | ... | ... |

Referring to Table A manager system 110 can allocate relatively greater time for content returned pursuant to a keyword search using a label of a primary node than for content returned pursuant to a keyword search using a label of a node other than the triggering node. The time allocation can be increased as the node spacing distance increases. For example referring to segment 06 of Table A the time allocation for content returned from a search using a keyword of a node having a node separation distance 2 from a relationship graph's primary node (where the label for the primary node triggers selection of the relationship graph as a relationship graph keying media content generation) can be less than for content returned from a search using a keyword of a node having a node separation distance 1. According to the formatting described in Table A, manager system 110 can loop segments corresponding to a certain node ordering of a selected relationship graph, but content for each pass through the loop can be differentiated (first content can be included in first pass and second content in a second pass and so on). Manager system 110 for formatting text content into a video file can create an image file representing the text and can provide a succession of repeated video frames having content of the created image file and therefor content of the text content. Manager system 110 for formatting an image file into a video file can provide a succession of repeated video frames having content of the image file.

At block 1108 and/or block 1109 manager system 110 can output the media file generated at block 1107. In some embodiments, outputting at block 1108 and/or at block 1109 can activate live streaming so that playback is activated on receipt. As indicated by block 1108 output media content can be output to social media system 120, e.g. by updating a webpage accessible by user using one or more user computer device 130A-130Z. As indicated by block 1109 output media content can be output to one or more user computer device e.g. user computer device 130A without being sent to social media system 120. It has been noted that system 100 can be used to assist a user with overcoming cognitive recall difficulty in situations where the user is using an application other than an application supporting social media system 120. Embodiments herein recognize that in such situations and in other situations it may be advantageous for manager system 110 to bypass social media system 120 when outputting media content generated for assisting a user in overcoming cognitive recall difficulty.

As indicated by return block 1110 manager system 110 can perform receiving, processing, determining and outputting functions indicted by blocks 1101-1110 on a continual open loop basis in a manner that media content for output for assisting users in overcoming cognitive recall difficulty can be generated dynamically and adaptively. The media content output for assisting a user in overcoming cognitive recall difficulty can be dynamically generated so that different media content can be generated for different users. For example, during a first pass through block 1107 manager system 110 can generate media content for assisting first user and during a second pass manager system 110 can generate media content for assisting a second user. The media content output for assisting a user in overcoming cognitive recall difficulty can be dynamically and adaptively generated so that different media content can be generated for different events. For example during a first pass through blocks 1105-1107 manager system 110 can determine that a first user in encountering memory recall difficulty in relation to a first event and during a second pass through blocks 1105-1107 manager system 110 can determine that a second user (and/or the first user) is encountering memory recall difficulty in relation to a second event.

The media content output for assisting a user in overcoming cognitive recall difficulty can be dynamically and adaptively generated so that different media content can be generated at different times. The first pass and the second pass in the scenarios described hereinabove can be performed at different times (e.g. successively or subsequently to one another). The first pass and the second pass in the scenarios described hereinabove can be performed at common times (e.g. simultaneously).

Manager system 110 can employ various rules based criteria for generating media content for output. Manager system 110 as referenced earlier in connection with Table A according to one rule in one embodiment can include content in generated media content for output content in dependence on the node distance of the node depicted by the content from the primary node. As set forth herein a primary node of a relationship graph can be a node having a label that matches a determined topic of a current conversation and which triggers selection of a certain relationship graph having the node with the matching label as the relationship graph guiding generation of a media file for output. According to one embodiment, manager system 110 can be restricted from including in generated media content for output content that is related to a node that is more than N nodes (e.g. N=3) from a primary node that corresponds to a current topic of discussion. According to another embodiment manager system 110 can generate a video file and time allocation of the video file may be 60% time allocated to depictions of the event specified in the primary node, 30% to depictions (persons, attractions, next event) specified in node labels in nodes adjacent to the primary node, and 10% time allocated to depictions specified in nodes that are spaced from a primary node by more than one node. There is set forth herein a method including generating media content, wherein the generating comprises including content depicting subject matter specified by a node label of a certain node of the relationship graph in dependence on a node distance of the certain node from a primary node of the relationship graph.

Where a relationship node is an aggregated relationship node that aggregates crowdsourced relationship graph information of different users for a common event experienced for different users, manager system 110 for generating media content for output can employ rules based criteria that weighs in favor of items depicted in relationship graph information of the user determined to be encountering cognitive recall difficulty relative to another user having a relationship graph combined to form an aggregated relationship graph. For example, referring to the aggregated relationship graph of FIG. 8 where manager system 110 determines that a first user (user 1) is encountering cognitive memory recall difficulty and where manager system 110 generates media content for output that comprises a video file, manager system 110 according to one rules based criteria can allocate 85% of the run time of content of the video file to content depicting items specified in nodes on the right side of the relationship graph of FIG. 8 (the section corresponding to user 1) and 15% of the run time of content of the video file to content depicting items on the left side of the relationship graph of FIG. 8 (the section corresponding to user 2). Thus, a certain user determined to be experiencing cognitive recall difficulty can be assisted primarily based on the certain user's perspective of an event as represented in a data repository 122 while also being assisted by the perspective of one or more other user of social media system 120 as represented in data repository 122. There is set forth herein a method using a relationship graph, wherein the relationship graph is an aggregated relationship graph having first relationship graph information of a first user and second relationship graph information of a second user, wherein the method includes generating media content, and wherein the generating comprises including content depicting an item specified in a first node of the relationship graph in dependence on whether the first node is a node of the first relationship graph information or the second relationship graph information.

Certain embodiments herein may offer various technical computing advantages, involving computing advantages to address problems arising in the realm of computer networks such as processing delays and information acquisition delays resulting from a user experiencing cognitive memory recall difficulties. Embodiments herein can reduce or eliminate critical processing and data acquisition delays in a variety of emergency situations (health or business) involving online computer network environments. Embodiments herein can employ data structuring processes, e.g. employing relationship graphs for structuring data to transform unstructured data optimized for human processing into a form optimized for computerized processing. Embodiments herein can provide results and advantages that are not possible or practical without use of components of a technical computing environment, such as providing for augmentation of content of a human memory beyond the limits of human ability to recall events and items related to events. Embodiments herein can include artificial intelligence processing platforms featuring improved processes to transform unstructured data into structured form permitting computer based analytics and predictive decision making. In one embodiment a template graph can be provided which keys both collection of structured data and presentment of media content. Embodiments herein also can include machine learning platforms that leverage historical data for improved predictive analytics.

Figure 9:
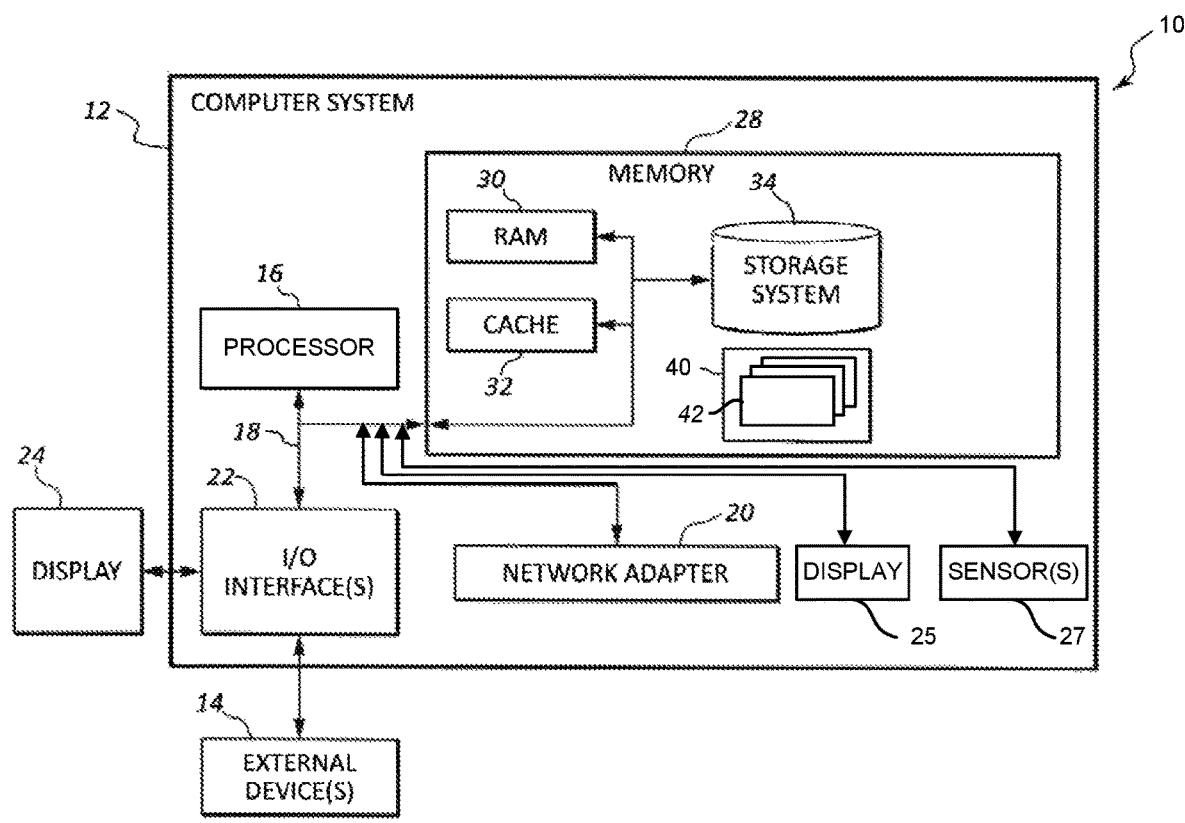
FIG. 9 depicts a computing node according to one embodiment.
Figure 10:
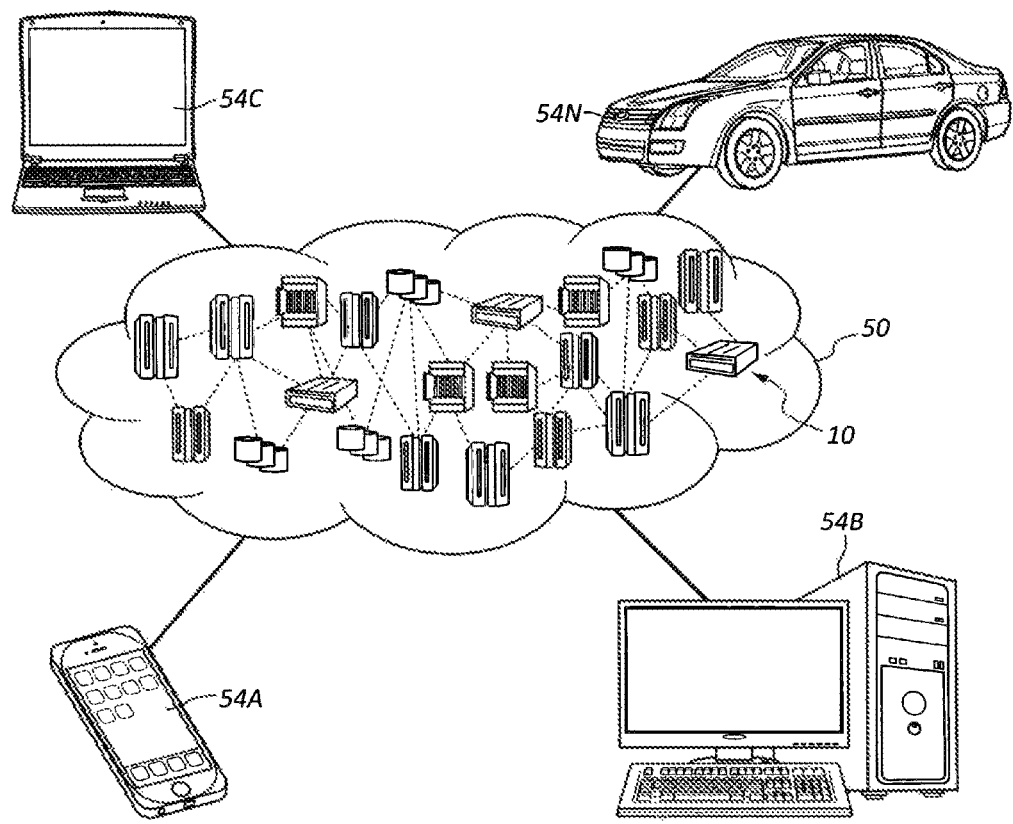
FIG. 10 depicts a cloud computing environment according to one embodiment.
Figure 11:
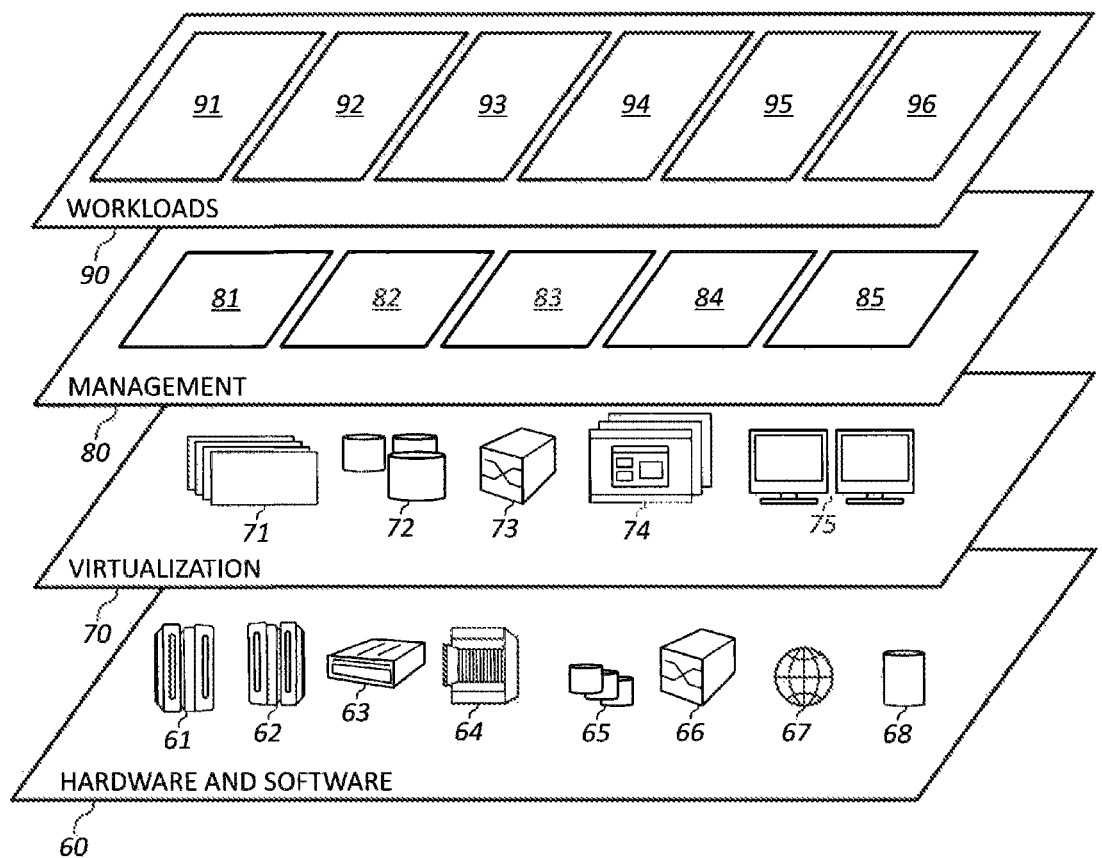
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 4, and the functions described with reference to manager system 110 as set forth in the flowchart of FIG. 5. In one embodiment, social media system 120 can include one or more computing node 10 and can include one or more program 40 for performing functions described with reference to social media system 120 as set forth in the flowchart of FIG. 5. In one embodiment, one or more user computer device 130A-130Z can include one or more computing node 10 and can include one or more program 40 for performing functions described with reference to one or more user computer device 130A-130Z as set forth in the flowchart of FIG. 5.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for cognitive recall assistance as described herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
processing, by one or more processor, social media system data to establish a relationship graph, wherein the processing includes aggregating relationship graph information of different relationship graphs so that the relationship graph is an aggregated relationship graph;
determining, by the one or more processor, that a user is encountering cognitive recall difficulty, wherein the determining includes comparing current input biometric data of the user to baseline biometric data of the user; and
responsively to the determining, outputting to the user, by the one or more processor, media content, wherein generating the media content includes performing a search of one or more data source for content using node labels of the relationship graph as keywords and providing a media file for playback by the user, the media file having content returned from the search.

2. The method of claim 1, wherein the processing includes aggregating relationship graph information of the user and of a second user so that the relationship graph is a crowdsourced aggregated relationship graph.

3. The method of claim 1, wherein the outputting includes selecting the relationship graph as a relationship guiding generating of media content based on the relationship graph having a label matching a topic of a current text based message of the user.

4. The method of claim 1, wherein the one or more data source includes a social media system and one or more additional system.

5. The method of claim 1, wherein the input biometric data is selected from the group consisting of current typing input biometric data, current audio input biometric data, current heart rate input biometric data, current blood pressure input biometric data, and current facial expression input biometric data.

6. The method of claim 1, wherein the determining includes examining content of a text based conversation involving the user.

7. The method of claim 1, wherein the determining includes examining a status of a flag that can be raised by the user using a user interface of a computer device of the user, that status indicating whether the user has affirmatively indicated that the user is encountering cognitive recall difficulty.

8. The method of claim 1, wherein the system data is social media system data of a social media system, and wherein the determining includes examining data independent of the social media system.

9. The method of claim 1, wherein the method includes aggregating relationship graph information of the user and relationship graph information of a second user to define the relationship graph and wherein the aggregating includes applying rules based criteria, and wherein according to the rules based criteria the relationship graph information of the second user is qualified for aggregating with the relationship graph information of the user conditionally on the condition that a node of the relationship graph information of the user specifies the second user.

10. The method of claim 1, wherein the method includes aggregating relationship graph information of the user and relationship graph information of a second user to define the relationship graph and wherein the aggregating includes applying rules based criteria, and wherein according to the rules based criteria the relationship graph information of the second user is qualified for aggregating with the relationship graph information of the user conditionally on the condition that (a) a node of the relationship graph information of the user specifies the second user and further conditionally on the condition that (b) the relationship graph information of the second user and the relationship graph of the user have common event nodes, the common event nodes specifying a common event.

11. The method of claim 1, wherein the method includes generating the media content, and wherein the generating comprises including content depicting an item specified in a first node of the relationship graph in dependence on a node distance of the first node from a primary node of the relationship graph.

12. The method of claim 1, wherein the relationship graph is an aggregated relationship graph having first relationship graph information of the user and second relationship graph information of a second user, wherein the method includes generating the media content, and wherein the generating comprises including content depicting an item specified in a first node of the relationship graph in dependence on whether the first node is a node of the first relationship graph information or second relationship graph information.

13. The method of claim 1, wherein the method includes aggregating relationship graph information of the user and second relationship graph information of a second user to define the relationship graph and wherein the aggregating includes applying rules based criteria, and wherein according to the rules based criteria the relationship graph information of the second user is qualified for aggregating with the relationship graph information of the user conditionally on the condition that (a) a node of the relationship graph information of the user specifies the second user and further conditionally on the condition that (b) the relationship graph information of the second user and the relationship graph of the user have common event nodes, the common event nodes specifying a common event, and wherein the generating comprises including content depicting subject matter specified by a node label of a certain node of the relationship graph in dependence on whether the certain node is a node of the relationship graph information or second relationship graph information.

14. A computer program product comprising:
- a computer readable storage medium readable by one or more processing unit and storing instructions for execution by one or more processor for performing a method comprising:
  - processing social media system data to establish a relationship graph, wherein the processing includes aggregating relationship graph information of different relationship graphs so that the relationship graph is an aggregated relationship graph;
  - determining that a user is encountering cognitive recall difficulty, wherein the determining includes comparing current input biometric data of the user to baseline biometric data of the user; and
  - responsively to the determining, outputting to the user media content, wherein generating the media content includes performing a search of one or more data source for content using node labels of the relationship graph as keywords and providing a media file for playback by the user, the media file having content returned from the search.

15. The computer program product of claim 14, wherein the outputting includes selecting the relationship graph as a relationship guiding generating of media content based on the relationship graph having a label matching a topic of a current text based message of the user.

16. The computer program product of claim 14, wherein the input biometric data is selected from the group consisting of current typing input biometric data, current heart rate input biometric data, current blood pressure input biometric data, and current facial expression input biometric data.

17. The computer program product of claim 14, wherein the determining includes examining content of a text based conversation involving the user.

18. The computer program product of claim 14, wherein the determining includes examining a status of a flag that can be raised by the user using a user interface of a computer device of the user, that status indicating whether the user has affirmatively indicated that the user is encountering cognitive recall difficulty.

19. The computer program product of claim 14, wherein the method includes aggregating relationship graph information of the user and relationship graph information of a second user to define the relationship graph and wherein the aggregating includes applying rules based criteria, and wherein according to the rules based criteria the relationship graph information of the second user is qualified for aggregating with the relationship graph information of the user conditionally on the condition that a node of the relationship graph information of the user specifies the second user.

20. A system comprising:
- a memory;
- at least one processor in communication with the memory; and
- program instructions executable by one or more processor via the memory to perform a method comprising:
  - processing social media system data to establish a relationship graph, wherein the processing includes aggregating relationship graph information of different relationship graphs so that the relationship graph is an aggregated relationship graph;
  - determining that a user is encountering cognitive recall difficulty, wherein the determining includes comparing current input biometric data of the user to baseline biometric data of the user; and
  - responsively to the determining, outputting to the user media content, wherein generating the media content includes performing a search of one or more data source for content using node labels of the relationship graph as keywords and providing a media file for playback by the user, the media file having content returned from the search.

* * * * *